US005313696A

United States Patent [19]

Dunne et al.

[11] Patent Number: 5,313,696

[45] Date of Patent: May 24, 1994

[54] METHOD AND APPARATUS FOR REMOVING BLADE RING IN A RING FLAKER

[75] Inventors: Michael J. Dunne, North Vancouver, Canada; Douglas C. Beer, Bellingham, Wash.; Jan Marek, Surrey, Canada

[73] Assignee: CAE Machinery Ltd., Vancouver, Canada

[21] Appl. No.: 123,425

[22] Filed: Sep. 17, 1993

[51] Int. Cl.[5] .......................... B23P 19/00; B27C 1/00

[52] U.S. Cl. ............................... 29/426.1; 144/162 R; 144/172; 144/373

[58] Field of Search ............... 241/285 A; 144/162 R, 144/172, 174, 373; 29/426.1, 426.3

[56] References Cited

U.S. PATENT DOCUMENTS 4,451,979 6/1984 Schuster ............................ 29/426.1

4,583,574 4/1986 Pallman ............................... 144/172

4,865,094 9/1989 Strand et al. .................... 144/162 R

*Primary Examiner*—W. Donald Bray

*Attorney, Agent, or Firm*—Fulwider Patton Lee & Utecht

[57] ABSTRACT

A ring flaker has a housing with a back opening so that a blade ring mounted to an arbor assembly can be slid backwards away from the housing to allow the blade ring to be replaced without removing the housing. This arrangement reduces the down time generally necessary to replace a blade ring in a ring flaker. The back opening in the housing is of sufficient size to permit the blade ring to be axially withdrawn. The arbor assembly has a slide arrangement on the ring flaker carriage and there is provision to use a hydraulic jack to move the arbor assembly on the slide arrangement for a distance sufficient for the blade ring to be disconnected for removal and replacement.

11 Claims, 6 Drawing Sheets

40
38
10
28
12
36
20
32
30
34
27
24
43
45
23
50
42
14
22
16
26
16
18

METHOD AND APPARATUS FOR REMOVING BLADE RING IN A RING FLAKER

TECHNICAL FIELD

The present invention relates to ring flakers for cutting wood into flakes and more specifically to a method and apparatus for sliding a blade ring out of a housing of a ring flaker for ease of removal and replacement.

BACKGROUND ART

Ring flakers, sometimes referred to as stranders, are used to cut wood into flakes, wafers or strands for further processing into other products. The logs are fed into a wood chamber and clamped in place. The wood chamber is encompassed by a blade ring which rotates at high speed and has knife blades around the periphery. The blade ring is mounted on a hub attached to an arbor which in turn sits in an arbor support on a carriage that moves perpendicularly to the rotation of the blade ring. The logs are flaked by rotating the ring and moving the carriage forward slowly until all of the logs have been flaked. The carriage then retracts allowing the next batch of logs to be fed into the wood chamber for further processing. The flakes, wafers or strands pass downwards into a chute and are conveyed away below the carriage.

Any rocks or foreign material mixed in with the logs are also fed into the wood chamber and the knife blades contact these rocks or foreign materials. The only way for materials to exit the wood chamber is to pass through in the blade ring slots after being contacted by the knife blades and frequently damage is caused to the knife blades or to the ring itself. Unfortunately, these events occur at unscheduled times and it is important to be able to replace knife blades and also remove the blade ring and repair or replace it as quickly as possible to minimize down time and lost production.

At the present time, in order to remove a blade ring, it is generally necessary to disassemble the back stop for the logs and the wood chamber, remove the housing surrounding the top of the blade ring, and then disconnect the ring and lift it out of the machine. A new blade ring can then be replaced and the machine reassembled. It has been found that this removal and replacement process can take two or three days, thus the machine is unusable for this length of time which constitutes a considerable loss of production.

In U.S. Pat. No. 4,583,574 to Pallmann is disclosed a flaker machine for trunk and residual wood which includes a blade ring mounted on a hub which rotates on an arbor. Provision is made for the back stop and wood platform to pivot away from the front of the machine. If this is achieved, then one is able to slide the blade ring out of the front of the housing without having to remove the housing itself. This patent illustrates some heavy pivoting mechanisms which are likely to increase the cost of the flaker machine.

DISCLOSURE OF INVENTION

In the present invention we have found that a ring flaker may be made with a rear opening in the housing of sufficient size to allow the hub disc and blade ring to pass out therethrough. A removable cover is made for the housing, which may easily be removed, the arbor support, the arbor, the hub disc and the blade ring are slid axially backwards away from the housing for a distance that is sufficient to enable the blade ring to be disconnected from the hub disc and lifted up by a crane or other type of lifting equipment. Thus, by providing an axial sliding arrangement for the arbor support, one avoids the necessity of having to disassemble the housing or remove the back stop and the wood chamber. Furthermore, one does not need heavy pivoting mechanisms for pivoting the back stop and the wood chamber, thus there is not an excessive increase in cost to manufacture the ring flaker. Furthermore, by utilizing the present system, it has been found that one can change a blade ring in a single shift, namely about eight hours, rather than the normal down time of two to three days necessary to replace blade rings in conventional machines.

The present invention provides in a ring flaker apparatus for cutting wood into wood flakes, including a housing having a front opening for insertion of wood to be flaked; a blade ring within the housing encompassing a wood chamber, the blade ring having a plurality of knife blades spaced apart around the ring; a hub disc attached to the blade ring, the hub disc cantilevered on an arbor rotating about a rotational axis supported by an arbor support outside the housing; drive means to rotate the arbor, hub disc and blade ring; carriage on which the arbor support is mounted, and means to move the carriage in a direction perpendicular to the rotational axis; the improvement to remove and replace the blade ring comprising: back opening in the housing of sufficient size to permit the hub disc and the blade ring to axially move out of the housing; arbor support slide means to permit axial movement of the arbor support on the carriage in a direction away from the housing so the blade ring and hub disc pass through the back opening in the housing, and means to slide the arbor support for a distance sufficient for the blade ring to be disconnected from the hub disc and lifted up for removal and replacement.

In a further embodiment, there is provided in a ring flaker apparatus for cutting wood into wood flakes, including a housing having a front opening for insertion of wood to be flaked; a blade ring within the housing encompassing a wood chamber, the blade ring having a plurality of knife blades spaced apart around the ring; a hub disc attached to the blade ring, the hub disc cantilevered on an arbor rotating about a rotational axis, supported by an arbor support outside the housing; drive means to rotate the arbor, hub disc and blade ring; carriage on which the arbor support is mounted, and means to move the carriage in a direction perpendicular to the rotational axis; improvement of removing the blade ring from the housing comprising the steps of: sliding the arbor support axially so the hub disc and blade ring exit from a back opening in the housing, and disconnecting the blade ring from the hub disc.

BRIEF DESCRIPTION OF DRAWINGS

In drawings which illustrate embodiments of the present invention

BEST MODE FOR CARRYING OUT THE INVENTION

Figure 1:
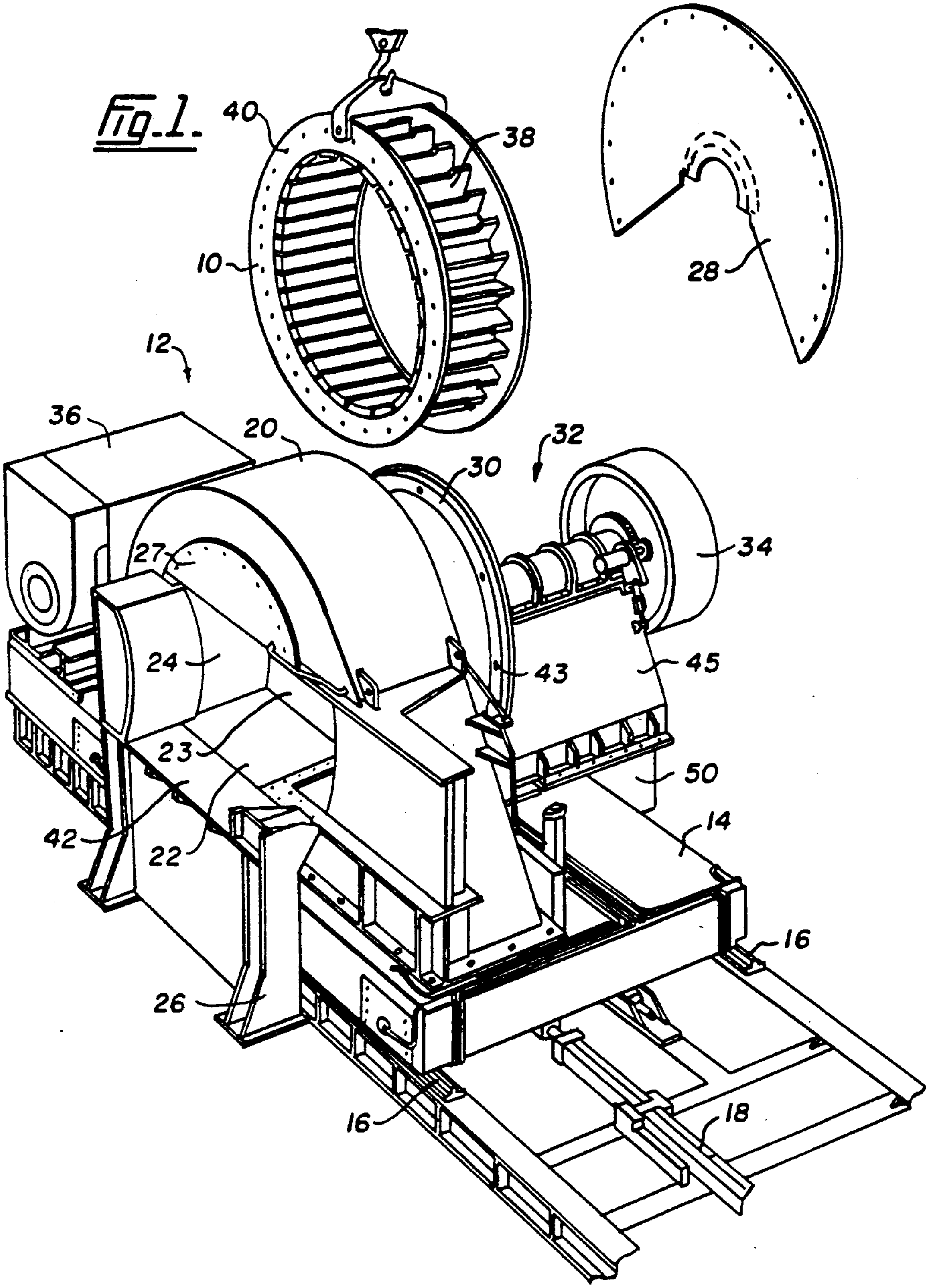
FIG. 1 is an isometric view showing a ring flaker apparatus according to the present invention with an arbor support moved backwards, a housing disc cover removed and a blade ring raised for removal or replacement.

A blade ring assembly 10 is shown in FIG. 1 raised above a ring flaker 12. The ring flaker 12 comprises a carriage 14 which moves backwards and forwards on rails 16 by means of a hydraulic cylinder 18. A housing 20 is supported on the carriage 14 and surrounds the ring 10 when it is installed. In the interior of the housing is a wood chamber 23 which has a wood platform 22 attached to the carriage and extending into the blade ring assembly 10. A back stop 24 curved to the exact shape of the inside of the ring 10 also extends into the wood chamber 23 and is supported by a back stop bracket 26 separate from the carriage 14. A wood platform 22 is supported from the carriage 14 and carries logs fed through a front opening of the housing 20 into the wood chamber 23.

The front opening of the housing 20 is sufficient to insert logs into the wood chamber 23, a front half cover plate 27 forms part of the wood chamber 23 and is bolted to the housing 20. The size of the front opening is defined by the cover plate 27. Knife blades can be changed individually by a cutout in the housing 20 (not shown). A removable cover disc 28 fits over a rear opening in the housing 20 and bolts to a surrounding rim. The cover disc 28 has a V-cutout in the lower portion and fits over the arbor supporting the blade ring assembly. FIG. 1 shows the cover disc 28 removed. This removal occurs after the blade ring assembly 10 is slid out of the housing 20.

The blade ring assembly 10 is supported at the periphery by hub disc 30 forming part of the arbor assembly 32 which will be described hereafter. The blade ring assembly 10 is rotated by a sheave 34 provided with a V-belt drive (not shown) from a motor sheave (not shown) driven by a motor 36 on the carriage 14.

The blade ring assembly 10 has a plurality of knife blades 38 around the periphery on the inside. These knife blades 38 fit into knife blade slots 40 so that individual knife blades 38 can be replaced without having to remove the blade ring assembly 10. However, if the blade ring itself is damaged, then it must be removed for repair and replacement.

In operation logs are stacked up and pushed through the front opening of the housing 20 into the wood chamber 23 on the wood platform 28 until the ends of the logs almost touch the back of the chamber 23. The logs may be pushed sideways up against the back stop 24 but provided they are clamped, it is not always necessary that the logs are touching the back stop 24. A clamp mechanism (not shown) is provided to clamp a stack of logs from above on the support face 42 adjacent the wood platform 22. The carriage 14 is then advanced slowly and the knife blades 38 in the blade ring assembly 10 flake a section of the logs in the wood chamber 23. The wood platform 22 moves with the carriage 14 and slides under the back stop 24 which does not move with the carriage so that the logs are flaked up until the knife blades in the blade ring assembly are almost in contact with the back stop 24.

The carriage 14 then reverses, and the logs are advanced into the wood chamber 23 to commence another flaking step. The wood flakes drop downwards through the blade ring assembly 10 on to a flake discharge conveyor (not shown) provided underneath the carriage 14 and conveyed away for storage, transporting or further processing.

Figure 2:
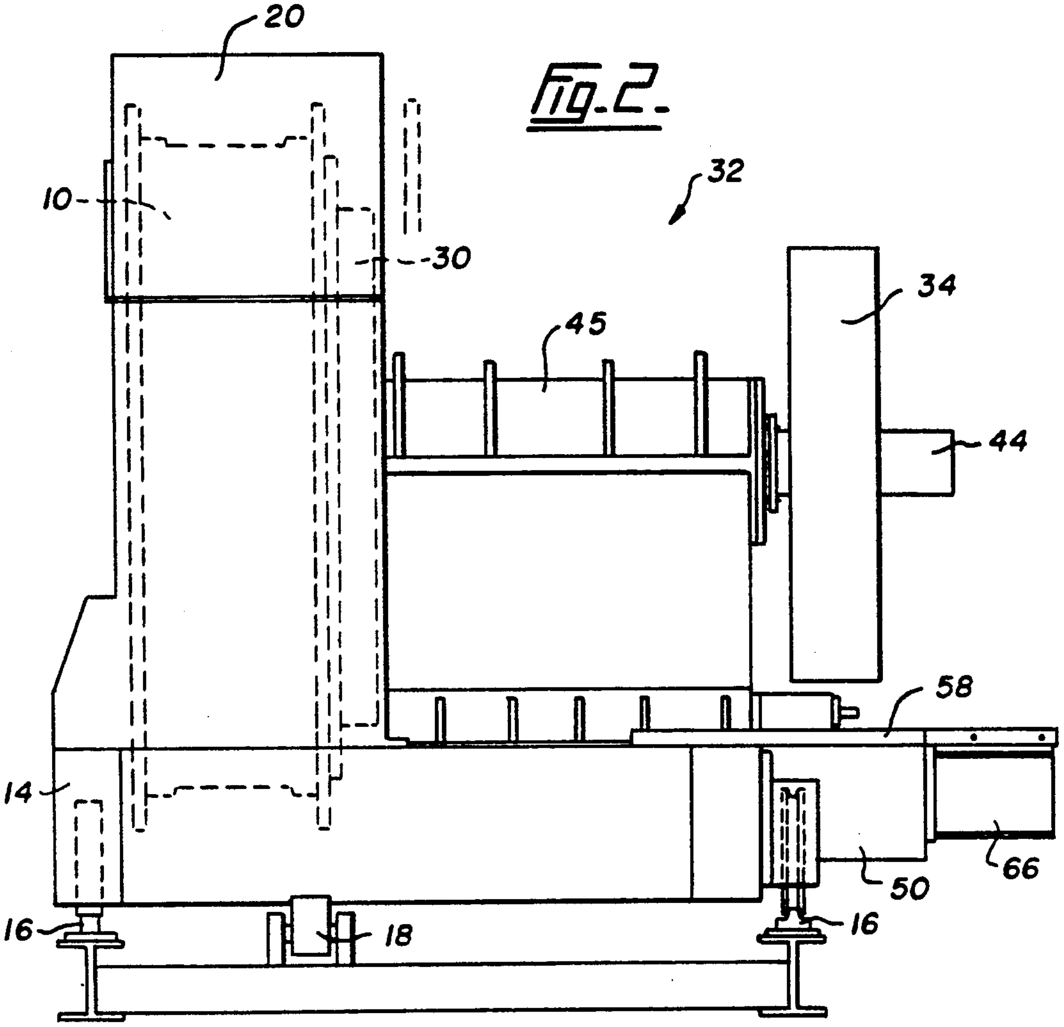
FIG. 2 is a side elevational view showing a ring flaker apparatus with a blade ring, hub disc and arbor supported by an arbor support on a carriage.
Figure 3:
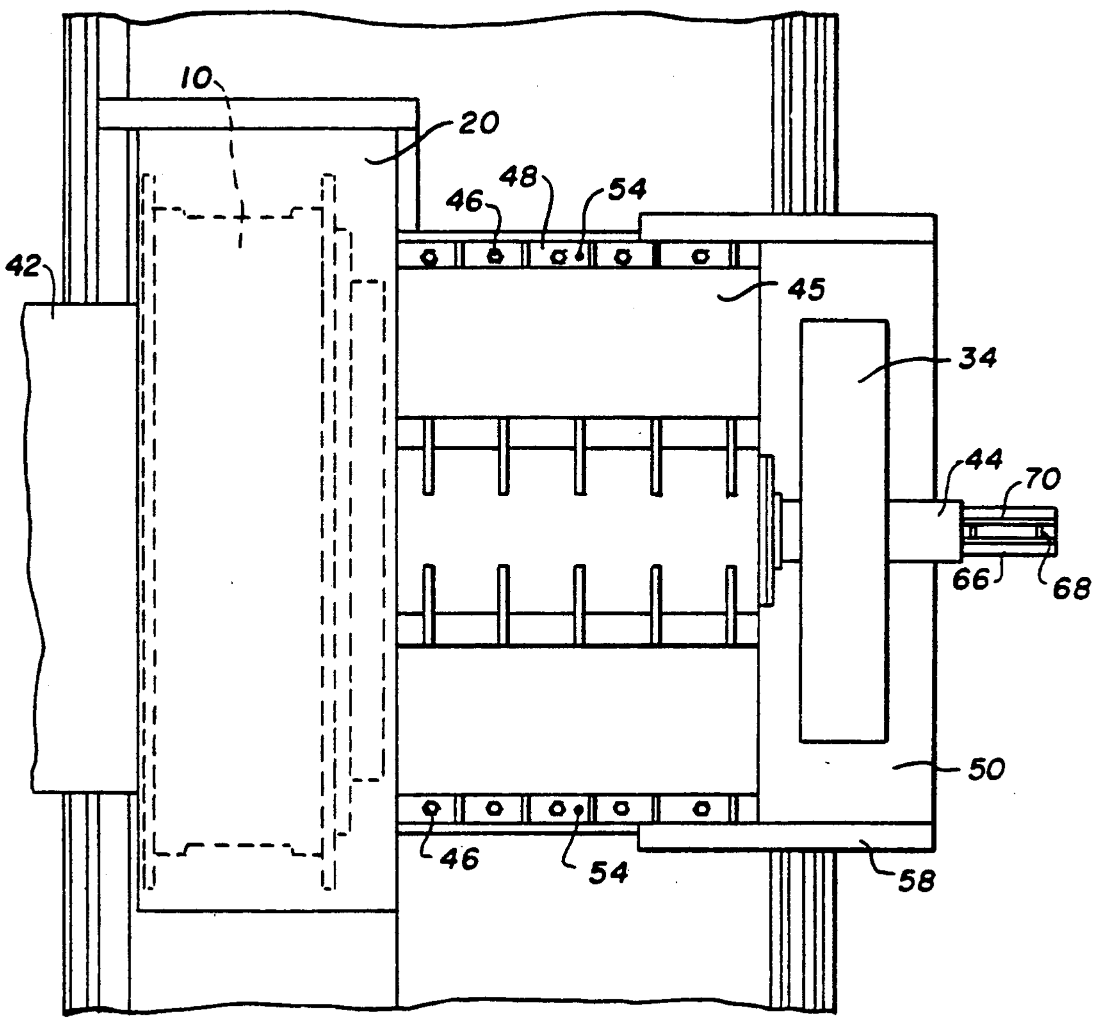
FIG. 3 is a plan view showing the ring flaker apparatus of FIG. 2.

As shown in FIGS. 2 and 3, the blade ring assembly 10 is attached to the hub disc 30 by means of bolts through bolt holes 43 around the periphery of the hub disc 30. The hub disc 30 is part of an arbor 44 which rotates in two bearings (not shown) in an arbor support frame 45 to form the arbor assembly 32. The blade ring assembly 10 and hub disc 30 are cantilevered on the arbor 44. The other end of the arbor 44 is joined to the drive sheave 34. The arbor support frame 45, shown in FIGS. 2 and 3, is a welded structure having a series of bolts 46 on each side through flanges 48 that are attached to the top plate of the carriage 14 and thus hold the arbor assembly 32 to the carriage 14.

As shown in FIG. 1, the cover disc 28 has been removed, and the ring assembly 32 moved backwards through the back opening in the housing 20 so sufficient space is available to disconnect the blade ring assembly 10 from the hub disc 30. The blade ring assembly 10 is shown lifted vertically upwards for replacement purposes. An extension frame 50 is mounted on the side of the carriage 14 as shown in FIGS. 2 and 3 to provide a support path when the arbor assembly 32, which includes ring assembly 10, hub disc 30, arbor 44 and arbor support frame 45, is slid axially away from the housing 20.

Figure 6:
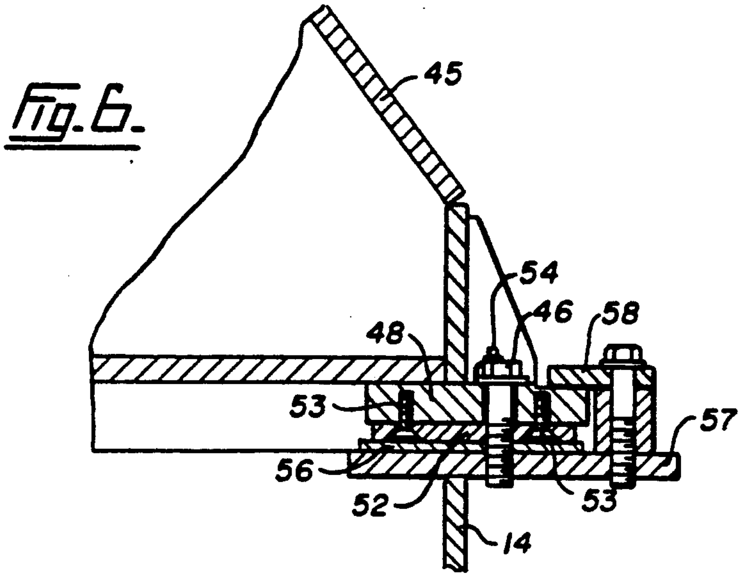
FIG. 6 is a detailed sectional view taken at line 6—6 of FIG. 3.

As shown in FIG. 6, the side flanges 48 of the arbor support have wear plates 52 attached by countersunk head machine bolts 53 to the underside of the flanges 48. The wear plates 53 have lubrication grooves (not shown) therein and grease fittings 54 are provided on the side flanges 48 so that grease may be inserted into the lubrication grooves of the wear plates 52. Sliding strips 56 are attached to the top plate 57 of the carriage 14 to provide a sliding path for the arbor support frame 45. Gib plates 58 as shown in FIG. 6, cover the edges of the side flanges 48 and extend over the extension frame 50 and some of the top plate 57 of the carriage 14. The gib plates 58 are bolted firmly to the carriage 14 and thus prevent any tipping of the arbor support frame 45 when being slid out from the housing 20.

The rear opening in the housing 20 is of sufficient size for the blade ring assembly 10 and hub disc 30 to be slid out. The cover disc 28 is unbolted before the arbor assembly 32 can be slid on the sliding strips 56. The cover disc 28 is removed after the arbor assembly 32 has been moved. It has been found that in one embodiment a 46 inch travel is required for the arbor assembly 32 to be withdrawn in order for the blade ring assembly 10 to completely clear the housing 20 when raised by a crane or other lifting device.

An arbor support slide attachment 66, as shown in FIGS. 2 and 3, is attached to the back face of the extension frame 50 positioned directly under the centerline of the arbor 44 and has a series of pins 68 extending between plates 70, the pins 68 being used for step-by-step jacking to slide the ring assembly 32 axially along the sliding strips 56.

Figure 4:
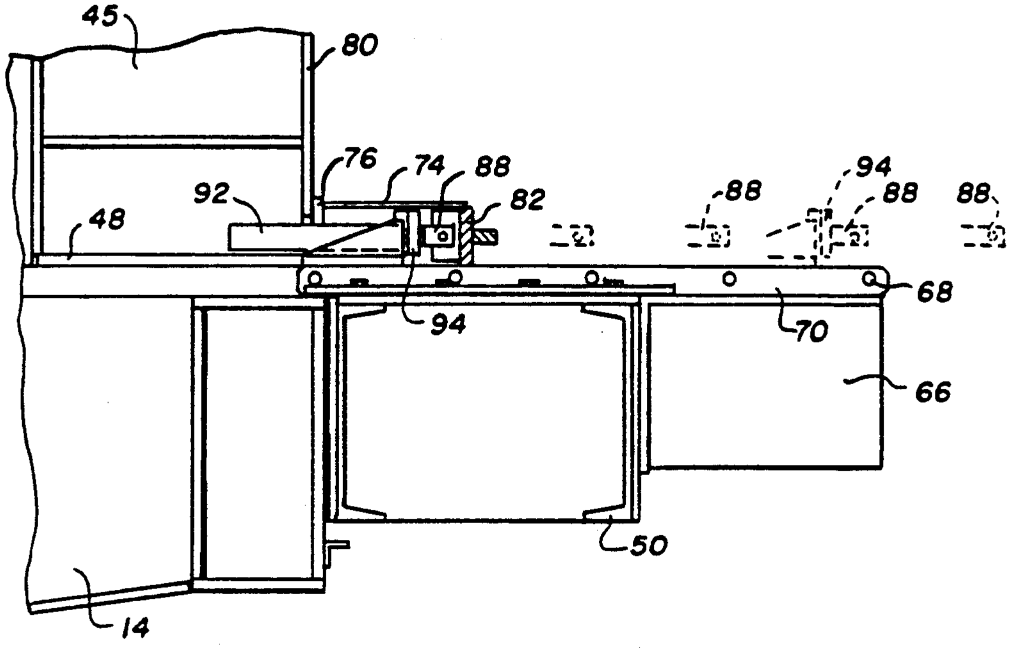
FIG. 4 is a partial side elevational view showing the ring flaker apparatus of FIGS. 2 and 3 with a hydraulic jack positioned to move the arbor support in a series of steps for withdrawal of the ring assembly.
Figure 5:
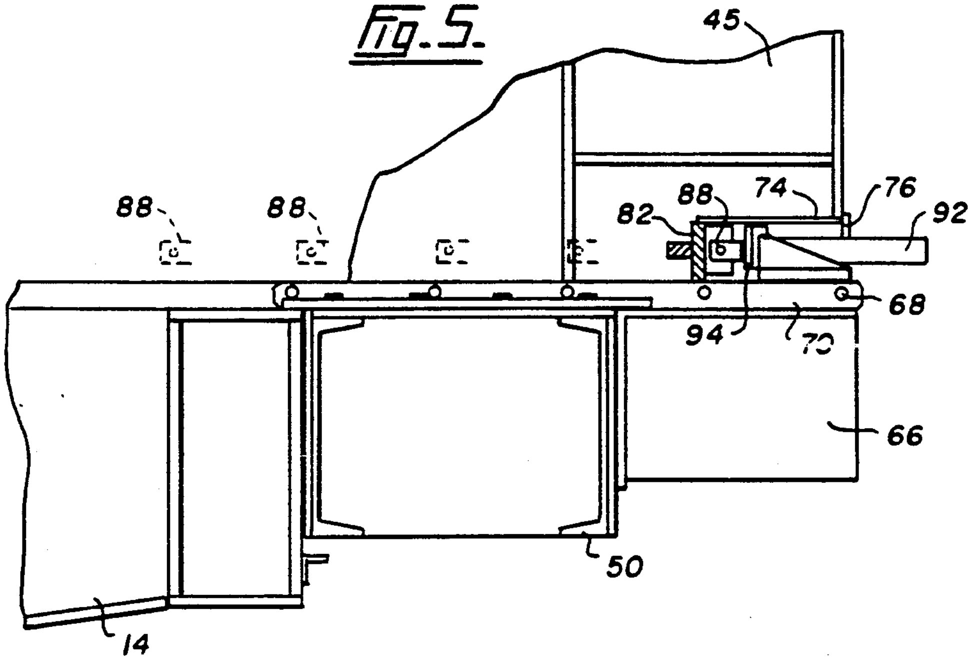
FIG. 5 is a partial side elevational view similar to that shown in FIG. 4 with the hydraulic jack mounted in the opposite direction to install the ring assembly.
Figure 7:
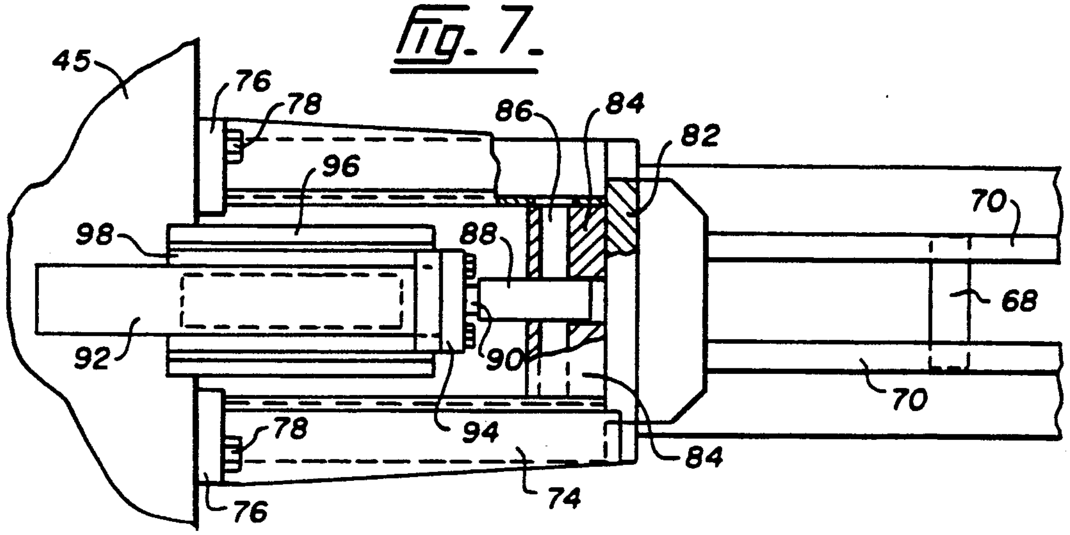
FIG. 7 is a partial plan view showing the extraction cylinder mounting arrangement for withdrawing the ring assembly.
Figure 8:
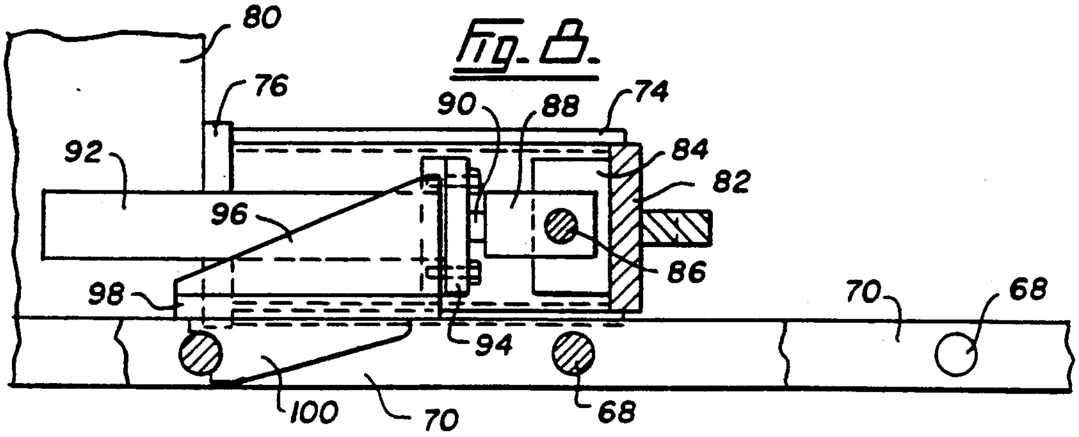
FIG. 8 is a partial side elevational view showing the cylinder mounting arrangement of FIG. 7.

As shown in FIGS. 4 and 5, the plates 70 of the arbor support slide attachment 66 extend from the side of the carriage frame 14 across the extension frame 50 to the end of the arbor support slide attachment 66. A cylinder anchor 74, shown in more detail in FIGS. 7 and 8, has flanges 76 with bolts 78 that join to an end plate 80 of the arbor support frame 45. FIG. 4 shows the installation of the cylinder anchor 74 for withdrawal of the ring assembly 32. The cylinder anchor 74 has an end plate 82 to which are attached two blocks 84 with a hole for a clevis pin 86 to attach to a plunger clevis 88 at the end of a piston rod 90 from a hydraulic cylinder 92. The cylinder 92 is attached at its front to a mounting block 94 which in turn is attached to a hydraulic cylinder bracket 96. The bracket 96 has a base plate 98 which rests on the two plates 70 of the arbor support slide attachment 66 and has a catch arm 100 extending down below the hydraulic cylinder bracket base plate 98 to engage one of the pins 68 supported by the arbor support slide attachment plates 70.

Figure 9:
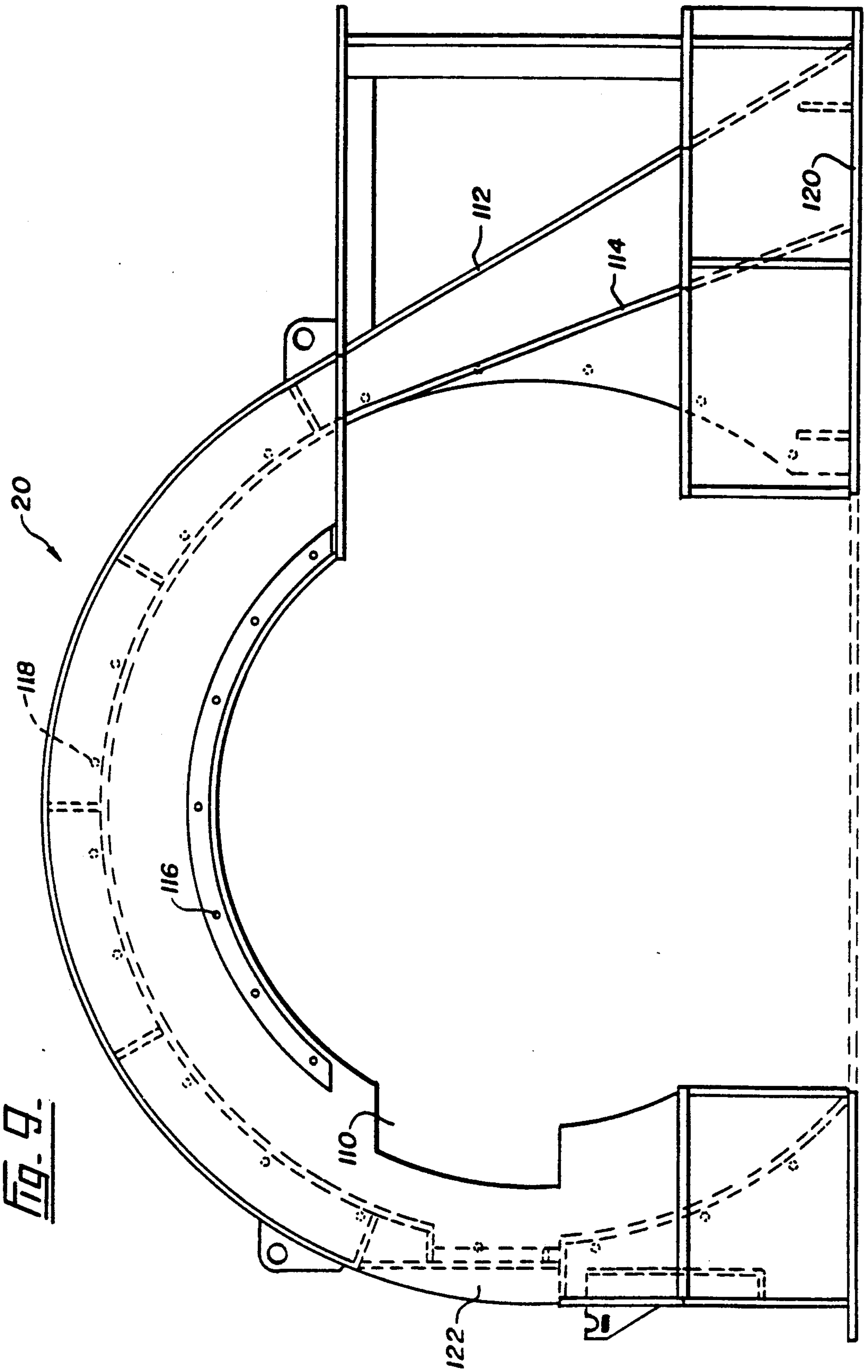
FIG. 9 is a side elevational view showing a housing for the ring flaker apparatus of FIG. 1.

Construction of the housing 20 is shown in FIG. 9. Because the housing 20 has a large front opening for insertion of logs and a large rear opening for withdrawal of the complete arbor assembly 32 including the blade ring assembly 10, it is specially strengthened. The front half cover plate 27 attached to the front opening of the cover plate is part of the wood chamber 23 but does not provide strength to the housing 20. As may be seen, the housing 10 has a cutout 110 on the side away from the wood chamber 23 for removal and insertion of knife blades. The housing 20 has a double wall construction with an exterior peripheral wall 112 extending around the outside and an inner peripheral wall 114 having a smaller diameter than the outer peripheral wall and inside therein. The walls 112 and 114 are supported by the sides with front tapped holes 116 for bolts to attach the housing 20 to the front half cover plate 27 and rear tapped holes 118 positioned just outside the inner peripheral wall 114 for bolts to attach the cover disc 28 to the housing 20.

On one side of the housing 20 the inner peripheral wall 114 and the outer peripheral wall 112 extend down to mounting flanges 120 for attachment to the carriage 14. On the other side, away from the wood chamber 23, the walls 112 and 114 have an opening 122 adjacent the cutout 110 for removal of knife blades. The double wall construction provides sufficient strength to the housing to counter the large rear opening.

For withdrawal, the cylinder anchor 74 has the flanges 76 attached by bolts 78 to the outside plate 80 of the arbor support frame 45 extending outwards. The hydraulic cylinder bracket 96 is positioned with the catch arm 100 engaging the first of the pins 68 between plates 70 of the arbor support slide attachment 66. The hydraulic cylinder 92 is connected to a hydraulic system and the piston rod 90 extends pushing against the cylinder anchor 74 so that the complete arbor assembly 32, including the ring assembly 10, slides along the provided sliding strips 56. When the piston rod 90 comes to the end of its stroke, then the hydraulic pressure is turned off, the cylinder 92 allowed to drain of hydraulic fluid so that the cylinder 92 retracts slowly on the piston rod 90. Some pressure to the cylinder 92 may be necessary for retracting as the catch arm 100 must rise up over the next pin 68 and drop down on the other side of the pin 68. The hydraulic cylinder bracket 96 supporting the cylinder 92 can then be pivoted upwards about the clevis pin 86 and moved forward so that the catchment arm 100 engages the next pin 68. The hydraulic cylinder 92 is again pressurized and the piston rod 90 pushes the cylinder anchor 74 forward moving the arbor assembly 32 the next step. Further steps are carried out until the arbor assembly 32 has moved the required distance and one is then able to unbolt the ring assembly 10 from the hub disc 30. The ring assembly 10 can then be lifted clear of the arbor assembly 32 and new or repaired blade ring assembly 10 can be inserted.

Before commencing movement of the arbor support frame 45, lubrication is applied to the wear plates 52 to ensure that they slide smoothly on the sliding strips 56. The gib plates 58 ensure that the arbor support frame 45 does not tip and also ensures that it follows a predetermined path both forwards and backwards. While not shown, other guide plates are provided on the top plate 57 of the carriage 14 to ensure that the arbor support frame 45 always moves in a predetermined path and is always returned to its original position.

When a new blade ring assembly 10 has been mounted onto the hub disc 30, the flanges 76 of the cylinder anchor 74 are attached to the outside plate 80 of the arbor support frame 45 as shown in FIG. 5, so that the cylinder anchor 74 extends into the arbor support frame 45 rather than outside. The hydraulic cylinder bracket 96 supporting the hydraulic cylinder 92 is positioned the other way around than that shown in FIG. 4 and the catchment arm 100 of the hydraulic cylinder bracket 96 engages the other side of the pins 68 between the plates 70 of the arbor support slide attachment 66, thus ensuring that the movement of the piston rod 90 pushes the complete arbor assembly 32 with blade ring 10 attached inwards step-by-step in the same manner as the withdrawal operation. When the arbor assembly 32 is moved completely inwards, then bolts 46 may be reinserted to hold the arbor support frame 45 to the carriage 14.

The arbor support slide attachment 66 need only be attached to the extension frame 50 when it is necessary to slide the complete arbor assembly 32 out of the housing 20. The time to change a blade ring assembly 10, including assembly of the arbor support slide attachment 66, provided no unexpected difficulties occur, can be completed in a single shift of under eight hours. It is found that this is a lot less time than is necessary to remove and replace a blade assembly ring 10 with an old arrangement wherein the housing 20 had to be removed and the back stop 24 and the wood platform 22 moved out of the wood chamber 23 within the blade assembly ring 10 before the ring 10 could be lifted.

Whereas the arrangement for replacing the blade assembly ring 10 has been defined for a ring flaker, it will be apparent that the apparatus would be applicable for any rotating ring cutting arrangement to cut wood strips, strands, chips and the like, wherein a blade assembly ring on an arbor assembly can be slid out from the back of a housing, thus avoiding the necessity of having to disassemble the housing, back stop, base plates, wood platforms and other equipment that have to be removed before vertically lifting a blade assembly ring from its mounting.

Various changes may be made to the embodiments shown herein without departing from the scope of the present invention which is limited only by the following claims.

The embodiments of the present invention in which an exclusive property or privilege is claimed are defined as follows:

1. In a ring flaker apparatus for cutting wood into wood flakes including:

a housing having a front opening for insertion of wood to be flaked;

a blade ring within the housing encompassing a wood chamber, the blade ring having a plurality of knife blades spaced apart around the ring;

a hub disc attached to the blade ring, the hub disc cantilevered on an arbor rotating about a rotational axis, supported by an arbor support outside the housing;

drive means to rotate the arbor, hub disc and blade ring;

carriage on which the arbor support is mounted, and means to move the carriage in a direction perpendicular to the rotational axis;

the improvement to remove and replace the blade ring comprising:

back opening in the housing of sufficient size to permit the hub disc and the blade ring to axially move out of the housing;

arbor support slide means to permit axial movement of the arbor support on the carriage in a direction away from the housing so the blade ring and hub disc pass through the back opening in the housing, and means to slide the arbor support for a distance sufficient for the blade ring to be disconnected from the hub disc and lifted up for removal and replacement.

2. The ring flaker apparatus according to claim 1 wherein the arbor support slide means includes arbor support wear plates positioned on arbor slide tracks extending over an extension frame attached to the carriage, and wherein lubricating means are provided to lubricate the wear plates sliding on the arbor slide tracks.

3. The ring flaker apparatus according to claim 2 wherein the means to slide the arbor support comprises a removal hydraulic jack with cylinder anchor attached to the arbor support frame and a cylinder bracket for attachment to an arbor support slide attachment extending outwards from the extension frame attached to the carriage.

4. The ring flaker apparatus according to claim 3 wherein the arbor support slide attachment has a plurality of spaced apart pins, the cylinder bracket having an engagement means to engage one of the pins at a time and wherein the hydraulic jack moves the arbor support a short distance when engaged with one of the pins, and is removable to engage another of the pins and move the arbor support a further short distance thus moving the arbor support a series of short distances representing the distance sufficient for the blade ring to be disconnected from the hub disc.

5. The ring flaker apparatus according to claim 2 wherein the arbor support has side flanges, and wherein gib plates are attached to the extension frame on each side of the arbor support, the flanges sliding under a portion of the gib plates to prevent the arbor support from tipping and assist in guiding the arbor support when sliding axially.

6. The ring flaker apparatus according to claim 1 wherein the housing has a removable cover disc extending between the arbor and the back opening in the housing.

7. The ring flaker apparatus according to claim 1 wherein the housing has an outer peripheral wall concentric with an inner peripheral wall, with the walls supported by side plates.

8. In a ring flaker apparatus for cutting wood into wood flakes, including:

a housing having a front opening for insertion of wood to be flaked:

a blade ring within the housing encompassing a wood chamber, the blade ring having a plurality of knife blades spaced apart around the ring;

a hub disc attached to the blade ring, the hub disc cantilevered on an arbor rotating about a rotational axis, supported by an arbor support outside the housing;

drive means to rotate the arbor, hub disc and blade ring;

carriage on which the arbor support is mounted, and means to move the carriage in a direction perpendicular to the rotational axis;

the improvement of removing the blade ring from the housing comprising the steps of:

sliding the arbor support axially so the hub disc and blade ring exit from a back opening in the housing, and disconnecting the blade ring from the hub disc.

9. The process of removing the blade ring from the housing according to claim 8 wherein the arbor support slides a plurality of short distances utilizing a hydraulic jack.

10. The process of removing the blade ring from the housing according to claim 9 wherein the arbor support has arbor support wear plates that slide on lubricated arbor slide tracks.

11. The process of removing the blade ring from the housing according to claim 9 wherein gib plate means prevent the arbor support from tipping and guide the arbor support to slide in a predetermined path.

* * * * *